United States Patent
Kwon et al.

(10) Patent No.: US 12,502,791 B2
(45) Date of Patent: Dec. 23, 2025

(54) AUTOMATIC BATTERY REPLACEMENT SYSTEM AND METHOD FOR TRANSFER ROBOT

(71) Applicant: HL MANDO CORPORATION, Pyeongtaek-si (KR)

(72) Inventors: Oseok Kwon, Pyeongtaek-si (KR); Jeongjae Park, Pyeongtaek-si (KR); Dongseon Kim, Pyeongtaek-si (KR); Seongho Choi, Pyeongtaek-si (KR); Joonkyu Song, Pyeongtaek-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 18/966,975

(22) Filed: Dec. 3, 2024

(65) Prior Publication Data
US 2025/0187207 A1 Jun. 12, 2025

(30) Foreign Application Priority Data

Dec. 6, 2023 (KR) .................. 10-2023-0176054
Aug. 2, 2024 (KR) .................. 10-2024-0102945

(51) Int. Cl.
*B25J 15/06* (2006.01)
*B25J 19/00* (2006.01)
(Continued)

(52) U.S. Cl.
CPC ....... *B25J 15/0608* (2013.01); *B25J 19/0066* (2013.01); *E04H 6/305* (2013.01);
(Continued)

(58) Field of Classification Search
CPC ...... B25J 11/008; B25J 15/0608; B25J 18/04; B25J 19/005; B25J 19/0066; B25J 19/043; E04H 6/305; E04H 6/36

See application file for complete search history.

(56) References Cited

U.S. PATENT DOCUMENTS

| | | | |
|---|---|---|---|
| 8,519,715 B2 * | 8/2013 | Toomre | H01M 50/227 324/426 |
| 2013/0251481 A1 * | 9/2013 | Shani | E04H 6/36 414/231 |
| 2023/0392403 A1 * | 12/2023 | Choi | E04H 6/305 |

FOREIGN PATENT DOCUMENTS

| | | | |
|---|---|---|---|
| CN | 211054967 U | * | 7/2020 |
| CN | 112659964 A | | 4/2021 |

(Continued)

OTHER PUBLICATIONS

Machine Translation for CN 211054967 U (Year: 2020).*
Machine Translation for CN 213026340 U (Year: 2021).*

*Primary Examiner* — Jermie E Cozart
(74) *Attorney, Agent, or Firm* — Studebaker Brackett PLLC

(57) ABSTRACT

Disclosed are an automatic battery replacement system of a transfer robot which includes a transfer robot which autonomously moves and includes a lifting module which supports and lifts a cargo, a battery which is detachably mounted on the transfer robot and is provided as a power source to supply a power required for an operation of the transfer robot, and a battery replacement robot which sucks and handles the battery and performs an operation of sucking the battery previously mounted on the transfer robot to be removed or mounting a new fully-charged battery on the transfer robot and an automatic battery replacement method of a transfer robot using the same.

8 Claims, 9 Drawing Sheets

(51) Int. Cl.
   *E04H 6/30*   (2006.01)
   *B25J 9/04*   (2006.01)
   *B25J 11/00*  (2006.01)
   *B25J 18/04*  (2006.01)
   *E04H 6/36*   (2006.01)

(52) U.S. Cl.
   CPC .............. *B25J 9/043* (2013.01); *B25J 11/008* (2013.01); *B25J 18/04* (2013.01); *B25J 19/005* (2013.01); *E04H 6/36* (2013.01)

(56) References Cited

FOREIGN PATENT DOCUMENTS

| | | | | |
|---|---|---|---|---|
| CN | 213026340 U | * | 4/2021 | |
| CN | 112859833 A | * | 5/2021 | .............. B25J 15/04 |
| CN | 113070904 A | | 7/2021 | |
| CN | 115431933 A | | 12/2022 | |
| DE | 102019003454 A1 | * | 12/2019 | |

* cited by examiner

AUTOMATIC BATTERY REPLACEMENT SYSTEM AND METHOD FOR TRANSFER ROBOT

CROSS-REFERENCE TO RELATED APPLICATIONS

This application claims the priority of Korean Patent Application Nos. 10-2023-0176054 and 10-2024-0102945 filed on Dec. 6, 2023, and Aug. 2, 2024, respectively, in the Korean Intellectual Property Office, the disclosure of which is incorporated herein by reference.

BACKGROUND

Field

The present disclosure relates to an automatic battery replacement system and method for a transfer robot, and more particularly, to an automatic battery replacement system and method for a transfer robot which automatically replace a battery provided in a transfer robot which transports a cargo using a magnet gripper to reduce an idle time of the transfer robot and increase its operating rate.

Description of the Related Art

Forklifts are widely used throughout the industries as vehicles which load a relatively heavy cargo, transport it to the user's desired location, and then unload it. Generally, the forklift is equipped with a fork bar which is hydraulically lifted and operates to lift the cargo using the fork bar, move the cargo in the lifted state, and then put the cargo down at the desired location.

In the related art, the forklift required a driver to drive or operate, but recently, as the demand for logistics mechanization and automation technology has increased, unmanned forklifts are being developed, and interest in such an unmanned cargo transport technology is increasing.

Recently, automatic parking technologies have been introduced to perform autonomous parking of vehicles without user's intervention, contributing to driver's convenience. Automatic parking robots which automatically park vehicles may also be considered as a type of unmanned cargo transport technology.

In a parking robot which enters under the vehicle to directly lift the vehicle and then move to park the vehicle, a fork bar for lifting the vehicle, similar to a forklift, may be installed. The parking robot using the corresponding method is configured to move to the vehicle, lift the vehicle using the fork bar, and move while lifting the vehicle.

When the parking robot as described above is utilized, not only vehicle user's convenience is significantly improved but also a parking space is efficiently utilized in a narrow space to contribute to relieving parking shortages and urban traffic congestion.

In the meantime, a cargo transport device, such as a forklift, has an appropriate loading capacity for its size and purpose. If the center of gravity of the fork bar loaded with a cargo is severely unbalanced due to exceeded load weight during operation, inexperienced operation, or weight imbalance of the cargo, there is a risk of bodily injuries/property damages caused by falling of the loaded cargo or safety accidents caused by overturning of the device.

SUMMARY

In order to prevent the safety accidents as described above, it is necessary to accurately measure a weight and a center of gravity of a cargo loaded on the transfer device and perform motion control accordingly. To this end, a technical object of the present disclosure is to provide a transfer robot which is configured to automatically correct a control parameter according to the change in center of gravity according to the state of the loaded cargo to significantly improve a motion control performance.

Further, in the case of the transfer robot which operates with a battery as a power source, there are problems in that it takes several hours to charge the built-in battery and the transfer robot cannot operate while charging the battery, which results in a decrease in the operating rate. Therefore, another technical object of the present disclosure is to provide an automatic battery replacement system and method of a transfer robot which automatically replace a battery provided in the transfer robot using a magnet gripper to reduce an idle time of the transfer robot and increase an operating rate.

Technical objects of the present disclosure are not limited to the aforementioned technical objects and other technical objects which are not mentioned will be apparently appreciated by those skilled in the art from the following description.

According to an aspect of the present disclosure, an automatic battery replacement system of a transfer robot includes a transfer robot which autonomously moves and includes a lifting module which supports and lifts a cargo; a battery which is detachably mounted on the transfer robot and is provided as a power source to supply a power required for an operation of the transfer robot; and a battery replacement robot which sucks and handles the battery and performs an operation of sucking the battery previously mounted on the transfer robot to be removed or mounting a new fully-charged battery on the transfer robot.

The automatic battery replacement system of a transfer robot according to one aspect of the present disclosure may further include a controller which collects information about a remaining capacity of a battery mounted on the transfer robot and issues a battery replacement command to the transfer robot.

The battery replacement robot may be provided on a battery charging station.

Alternatively, the battery replacement robot is installed on an autonomously movable robot and the movable robot directly moves to the transfer robot which needs to replace the battery to perform the battery replacement task.

A mounting space in which the battery is mounted is formed in a body of the transfer robot and the battery may be mounted to be exposed on a surface of a vehicle body.

The battery replacement robot may suck the battery using a magnet gripper provided as an electromagnet.

At this time, the battery may include a metal case embedded with a battery pack.

The battery replacement robot may be provided as a gantry robot.

When the battery replacement robot is provided as a gantry robot, the battery replacement robot may include: a girder installed in a horizontal direction and an elastic member which is slidably coupled onto the girder and is provided to be stretchable in a vertical direction and the magnet gripper may be installed on an end of the elastic member.

Alternatively, the battery replacement robot may be provided as SCARA.

When the battery replacement robot is provided as SCARA, the battery replacement robot includes an arm member which is axially coupled around at least one rotary shaft and the magnet gripper may be installed on an end of the arm member.

Two battery replacement robots are provided so that one of the battery replacement robots may perform a task of removing the battery from the transfer robot and the other one may perform a task of mounting a fully-charged battery on the transfer robot.

In the meantime, according to another aspect of the present disclosure, an automatic battery replacement method of a transfer robot which autonomously moves and includes a lifting module which supports and lifts a cargo and detachably mounts a battery used as a power source includes a collecting step of collecting information about a remaining capacity of a battery mounted on the transfer robot; a command step of allowing a controller to issue a battery replacement command to the transfer robot when it is determined that it is necessary to replace a battery mounted on the transfer robot; a removing step of allowing a battery replacement robot to suck and remove a battery mounted on the transfer robot using a magnet gripper; and a mounting step of allowing the battery replacement robot to suck a fully-charged battery using a magnet gripper to be mounted on the transfer robot.

The automatic battery replacement method of a transfer robot according to another aspect of the present disclosure may further include a moving step of moving the transfer robot which receives the battery replacement command from the controller to a charging station in which a battery replacement robot is provided or allowing a movable robot including a battery replacement robot to be moved to the transfer robot which receives the battery replacement command.

The removing step and the mounting step may be sequentially performed by one battery replacement robot.

Alternatively, the removing step and the mounting step may be individually performed by different battery replacement robots.

According to the present disclosure, a transfer robot senses a displacement of a beam member on which a cargo is loaded using a strain gauge, estimates a changed center of gravity based on a sensing value, and corrects a control parameter based on the estimated center of gravity to significantly improve a motion control performance.

Further, the transfer robot according to the present disclosure has a structure in which a gear unit and a motor unit of the steering unit provided in a wheel driving module are separately manufactured to be detachably coupled, so it has effects of excellent assemblability and easy maintenance such as parts replacement and maintenance.

When the transfer robot according to the present disclosure is used as a parking robot, the transfer robot may automatically park the vehicle without intervention of the user so that the vehicle user's convenience is significantly improved and a limited parking space is efficiently utilized to increase a space usability.

Moreover, the automatic battery replacement system of a transfer robot provided by the present disclosure automatically replaces the battery provided in the transfer robot using a magnet gripper to reduce an idle time of the transfer robot and increase an operating rate.

The effects of the present disclosure are not limited to the technical effects mentioned above, and other effects which are not mentioned can be clearly understood from the following description The effects of the present disclosure are not limited to the aforementioned effects, and other effects, which are not mentioned above, will be apparently understood to a person having ordinary skill in the art from the following description.

The objects to be achieved by the present disclosure, the means for achieving the objects, and the effects of the present disclosure described above do not specify essential features of the claims, and, thus, the scope of the claims is not limited to the disclosure of the present disclosure.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
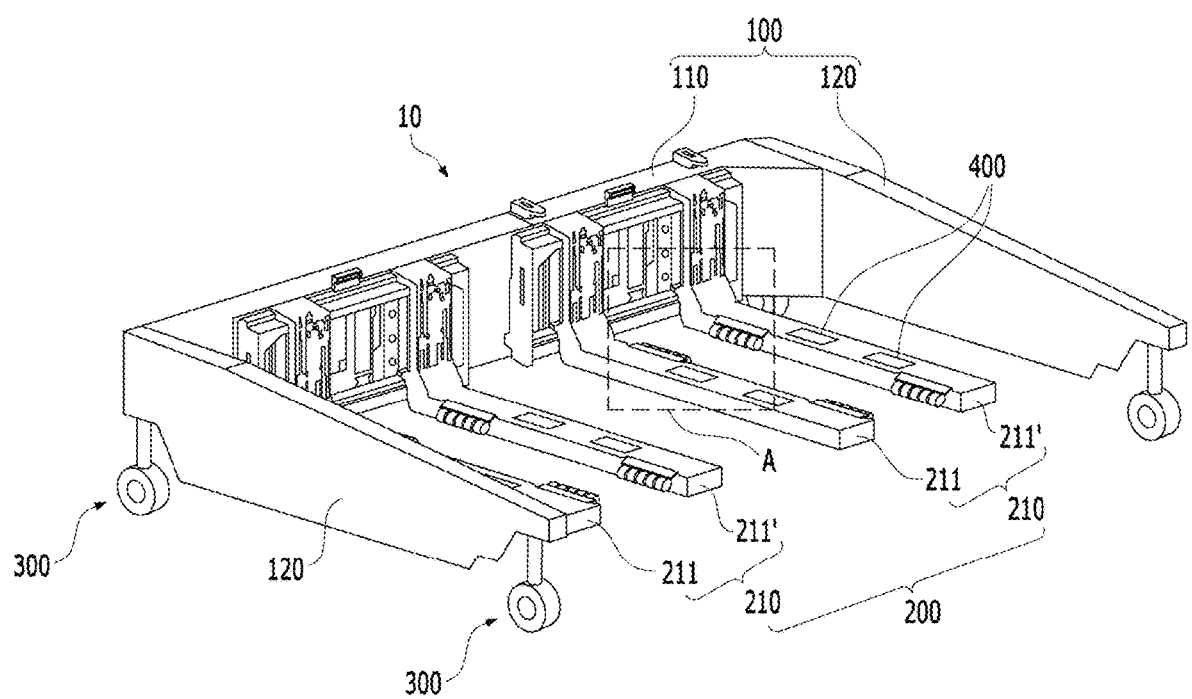
FIG. 1 is a view illustrating a transfer robot according to the present exemplary embodiment.

Hereinafter, the exemplary embodiment of the present disclosure will be described with reference to the accompanying drawings and exemplary embodiments as follows. Scales of components illustrated in the accompanying drawings are different from the real scales for the purpose of description, so that the scales are not limited to those illustrated in the drawings.

Hereinafter, embodiments of the present disclosure will be described in detail with reference to the accompanying drawings. The following exemplary embodiment is proposed to sufficiently transmit the spirit of the present disclosure to those skilled in the art. The present disclosure is not limited only to the exemplary embodiment to be proposed below and may be embodied in other forms. For better understanding of the present disclosure, in the drawings, parts that are not related to the description may be omitted and the sizes of components may be expressed as somewhat exaggerated.

Figure 2:
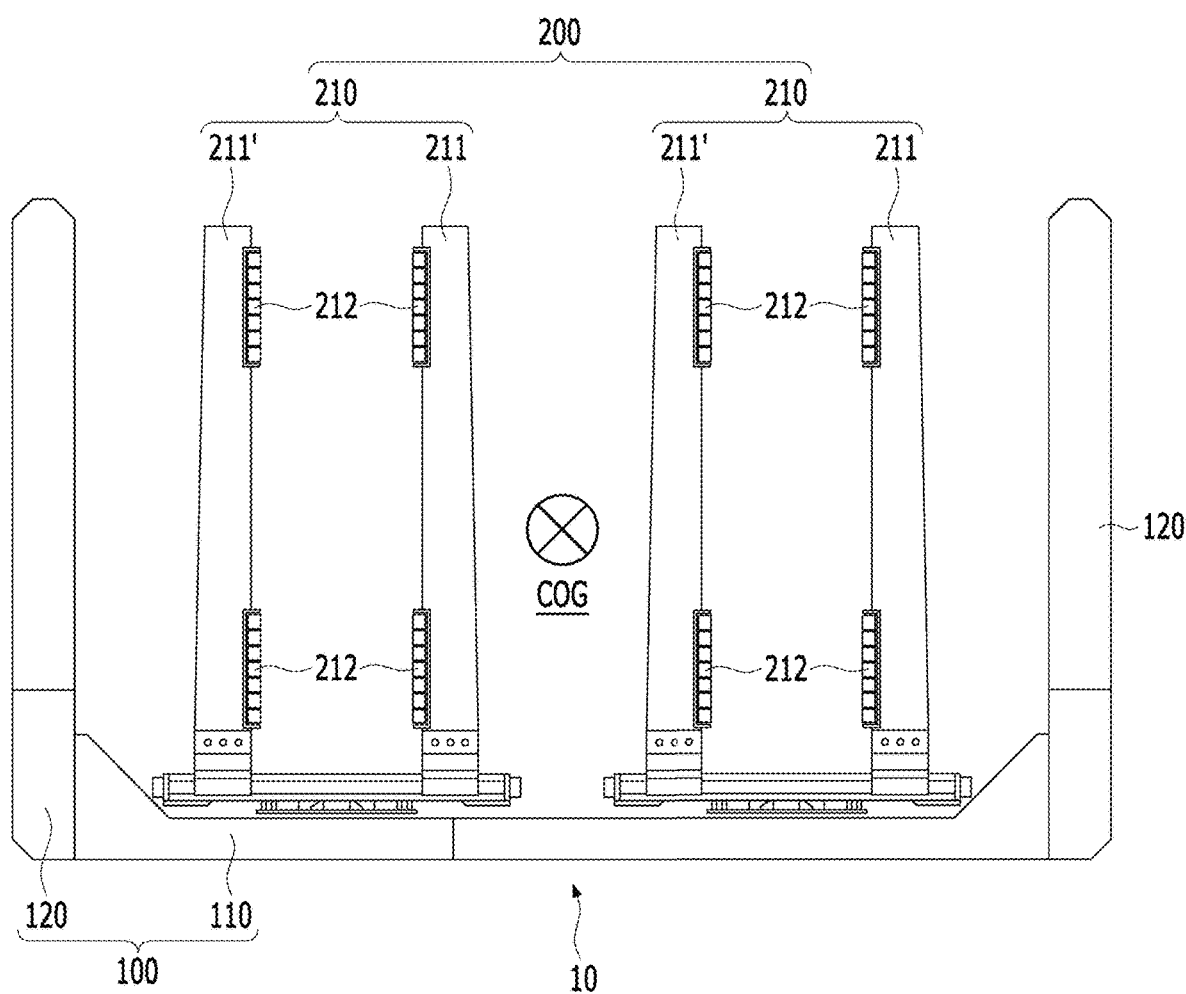
FIG. 2 is a plan view of a transfer robot according to the present exemplary embodiment illustrating a center of gravity in an unloaded state.
Figure 3:
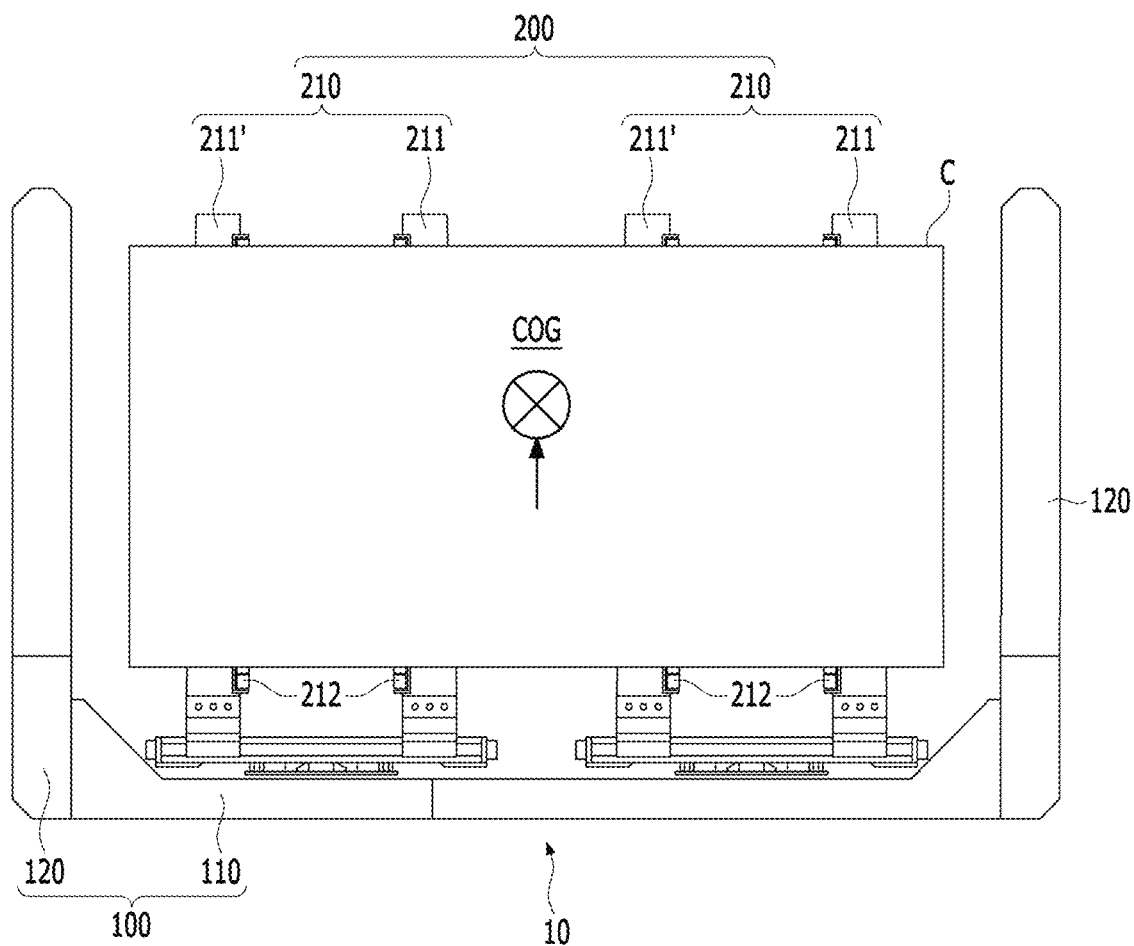
FIG. 3 is a plan view of a transfer robot according to the present exemplary embodiment illustrating change in a center of gravity in a loaded state in which a cargo is loaded.
Figure 4:
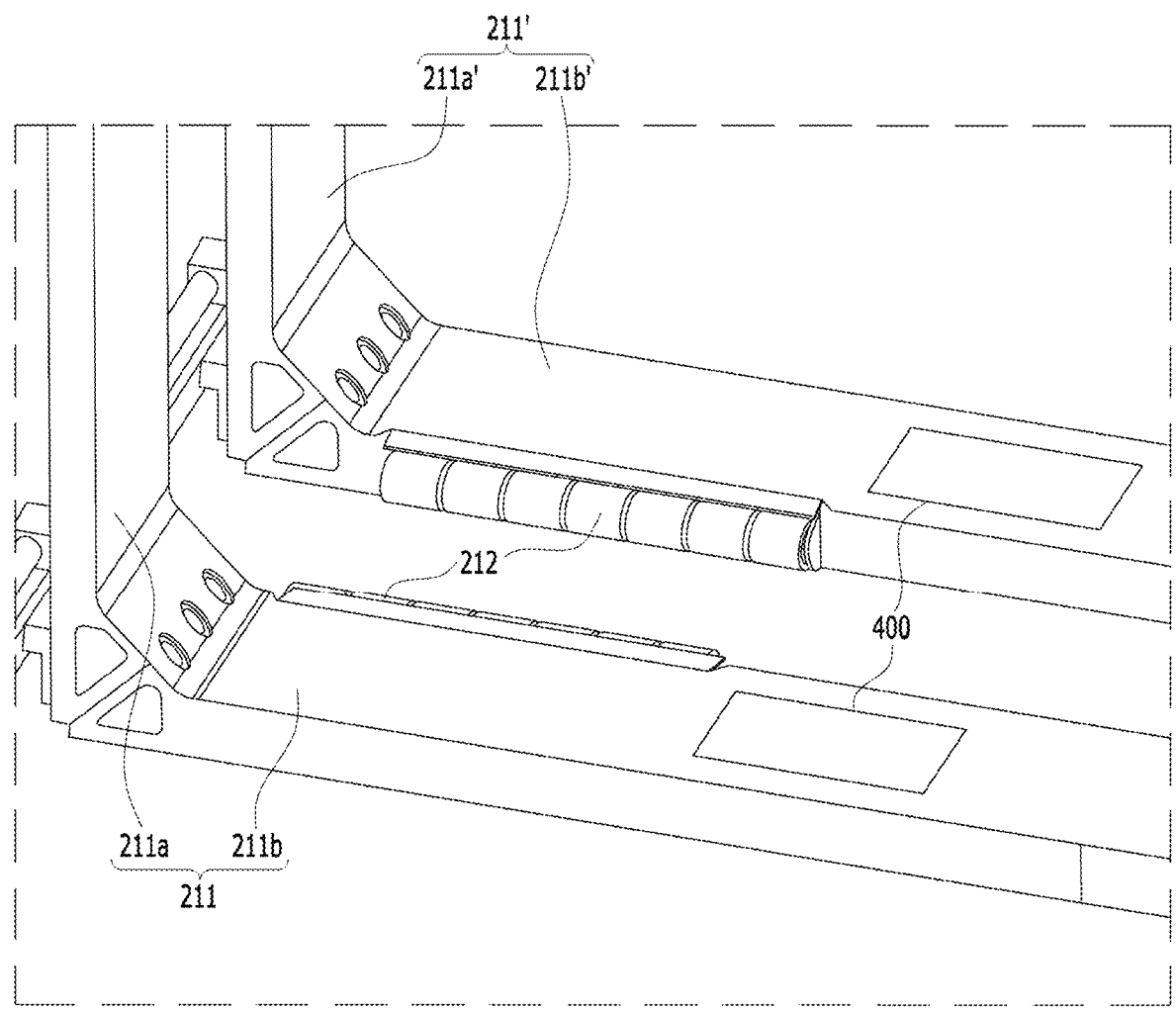
FIG. 4 is an enlarged view of a part denoted by "A" in FIG. 1 to explain a position where a strain gauge is attached onto a beam member.

FIG. 1 is a view illustrating a transfer robot according to the present exemplary embodiment. FIG. 2 is a plan view of a transfer robot according to the present exemplary embodiment illustrating a center of gravity in an unloaded state. FIG. 3 is a plan view of a transfer robot according to the present exemplary embodiment illustrating change in a center of gravity in a loaded state in which a cargo is loaded. FIG. 4 is an enlarged view of a part denoted by "A" in FIG. 1 to explain a position where a strain gauge is attached onto a beam member.

Figure 5:
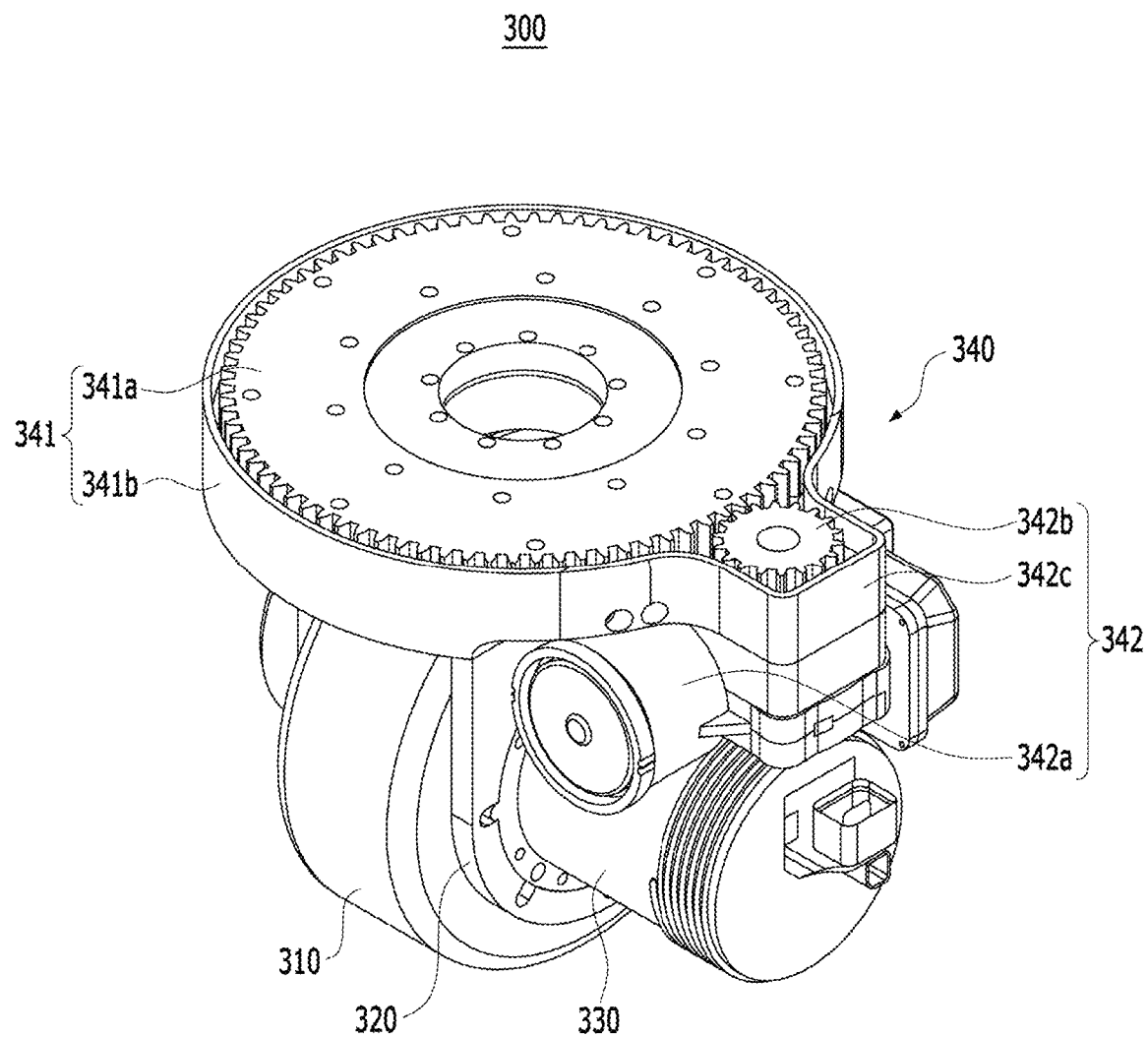
FIG. 5 is a perspective view illustrating an assembled state of a wheel driving module of a transfer robot according to the present exemplary embodiment.
Figure 6:
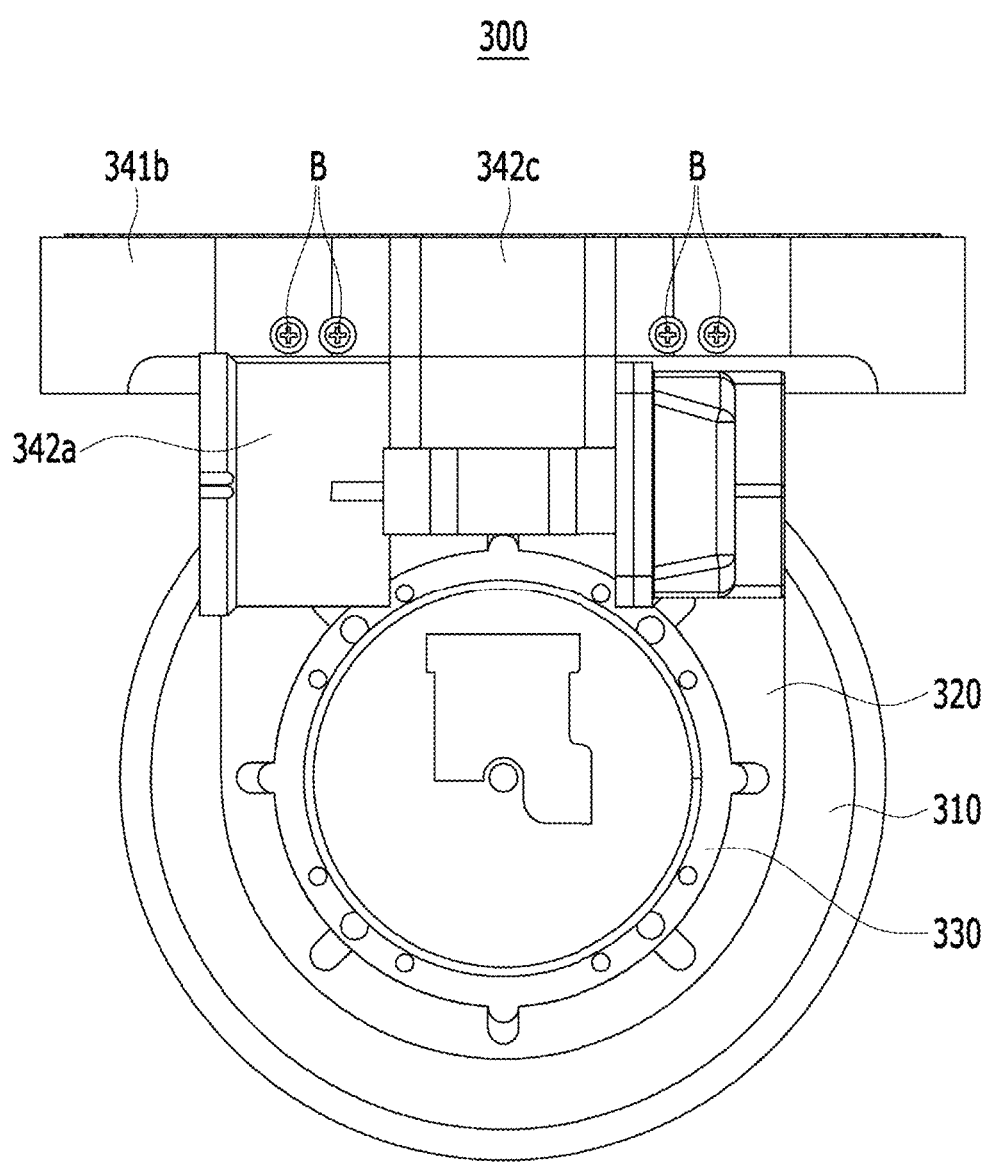
FIG. 6 is a side view illustrating an assembled state of a wheel driving module of a transfer robot according to the present exemplary embodiment.
Figure 7:
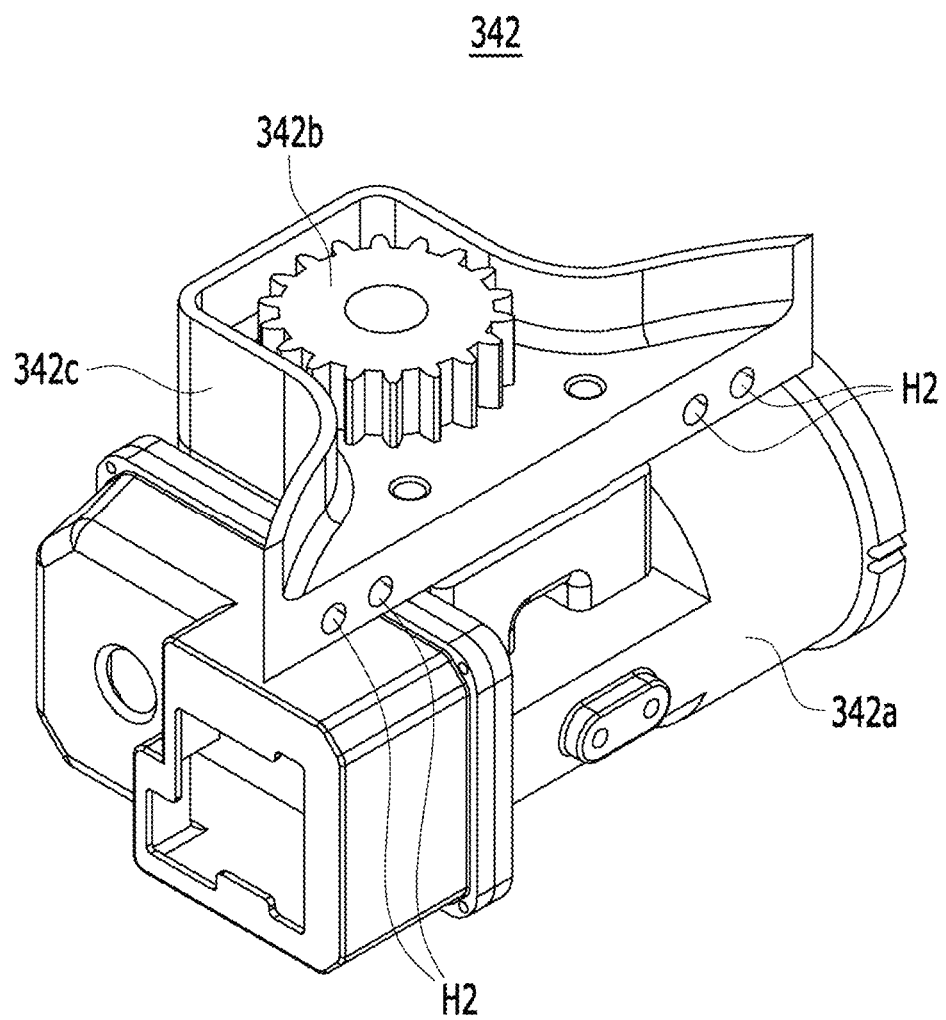
FIG. 7 is a perspective view illustrating a motor unit of a steering unit in a wheel driving module of a transfer robot according to the present exemplary embodiment.
Figure 8:
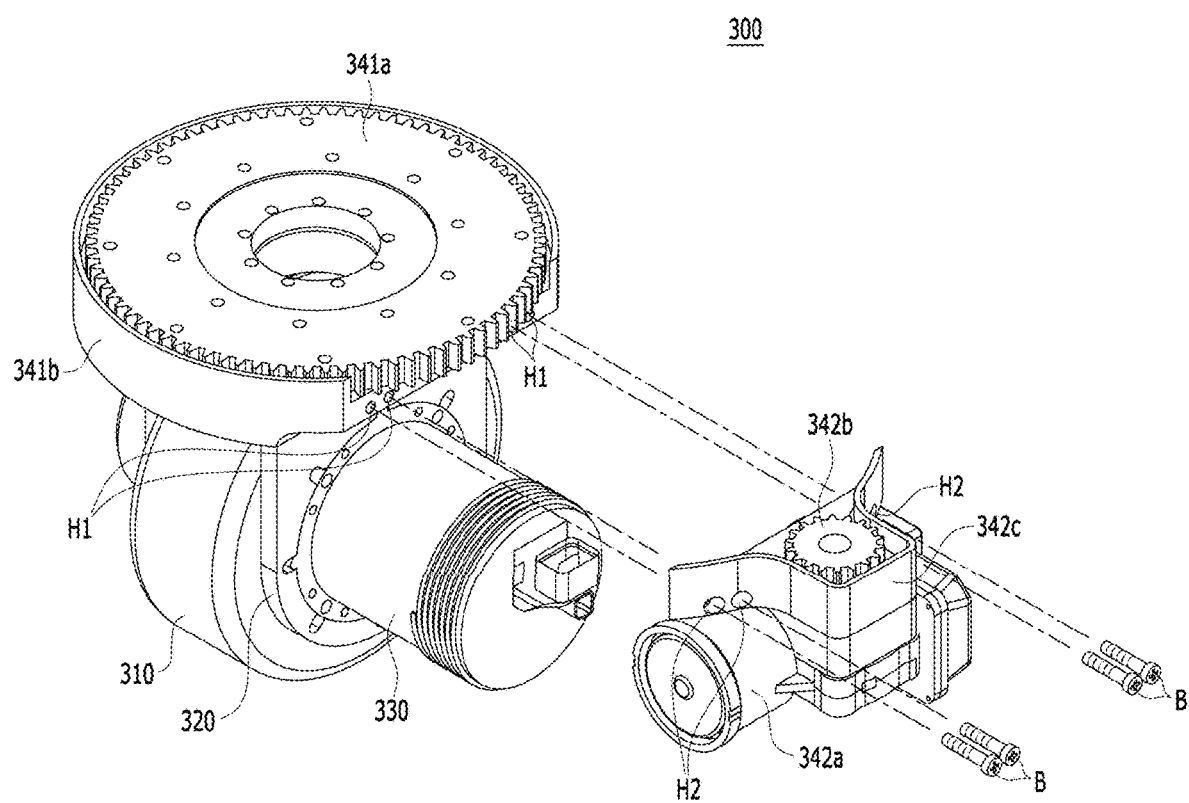
FIG. 8 is a perspective view illustrating a state in which a gear unit and a motor unit of a steering unit are separated in a wheel driving module of a transfer robot according to the present exemplary embodiment.

FIGS. 5 and 6 are a perspective view and a side view illustrating an assembled state of a wheel driving module of a transfer robot according to the present exemplary embodiment. FIG. 7 is a perspective view illustrating a motor unit of a steering unit in a wheel driving module of a transfer robot according to the present exemplary embodiment. FIG. 8 is a perspective view illustrating a state in which a gear unit and a motor unit of a steering unit are separated in a wheel driving module of a transfer robot according to the present exemplary embodiment.

Hereinafter, as an exemplary embodiment, a transfer robot according to the present disclosure is provided as a parking robot. However, the present disclosure is not limited thereto and the technical spirit of the present disclosure may be applied to any of cargo transport devices including a configuration (hereinafter, a "lifting module" in the exemplary embodiment) of lifting a cargo (hereinafter, a "vehicle" in the exemplary embodiment) and a configuration (hereinafter, a "wheel driving module" in the exemplary embodiment) which is provided to allow the transfer robot to autonomously move without being restricted by a shape or a structure.

First, referring to FIG. 1, a transfer robot 10 according to the present exemplary embodiment includes a frame module 100, a lifting module 200 which is movably installed on the frame module 100, and a wheel driving module 300 which is installed on a lower end of the frame module 100.

The transfer robot 10 according to the present exemplary embodiment has a frame module 100 as a base of the structure and may move to front and rear, left and right directions by the wheel driving module 300. Further, the transfer robot 10 according to the present exemplary embodiment may lift the vehicle using the lifting module 200, which is achieved by supporting wheels of the vehicle from the bottom by the lifting unit 210 of the lifting module 200 as it will be described below. At this time, the transfer robot 10 according to the present exemplary embodiment is configured to support all front and rear wheels of the vehicle to stably support the vehicle.

The transfer robot 10 according to the present exemplary embodiment as described above may perform the parking task by recognizing a vehicle and lifting the recognized vehicle and then moving the vehicle to a designated parking position. Further, the transfer robot 10 according to the present exemplary embodiment may automatically operate. For example, the transfer robot 10 according to the present exemplary embodiment may operate by a remote control device, such as a remote controller, without manual manipulation by an operator.

In the exemplary embodiment, the frame module 100 includes a first frame 110 and second frames 120 which extend from both ends of the first frame 110 in a direction perpendicular to an extending direction of the first frame 110 to have a substantially U-shape and may be provided to autonomously move by the wheel driving module 300 to be described below.

The transfer robot 10 according to the present exemplary embodiment approaches a side of the vehicle to park the vehicle. When the transfer robot 10 approaches the side to be located, the first frame 110 extends along the front and rear direction of the vehicle and the second frames 120 extend along a width direction of the vehicle. Further, when the lifting unit 210 of the lifting module 200 enters under the vehicle from the side of the vehicle, the vehicle to be parked is positioned within the 'U' shaped space formed by the first frame 110 and the second frames 120.

The frame module 100 may support the lifting module 200 to be described below to be movable. The lifting module 200 may slidably move along the extending direction of the first frame 110 while being coupled onto the first frame 110 of the frame module 100. To this end, a guide rail may be provided on the first frame 110. The guide rail is installed along the extending direction of the first frame 110 and movably supports the lifting module 200.

The guide rail is located at the outside of the first frame 110. The guide rail may be located to protrude from the outer surface of the first frame 110. Desirably, the guide rail is provided on at least one of a top surface and a front surface of the first frame 110 to movably support the lifting module 200.

In the first frame 110, a power unit (not illustrated) for driving the lifting module 200 to be described below, a power source (not illustrated) for supplying the power to the power unit, and a controller (not illustrated) for controlling the power unit may be accommodated.

In the exemplary embodiment, the lifting module 200 substantially performs a function of supporting wheels of the vehicle to lift the vehicle. In order to perform the operation of supporting and lifting the wheels of the vehicle, the lifting module 200 may move along a guide rail provided on the above-described first frame 110. That is, the lifting module 200 may be movably coupled to the guide rail provided on the first frame 110.

As illustrated in the drawing, the lifting module 200 of the present exemplary embodiment may be configured by one pair of lifting units 210 to support and lift front wheels and rear wheels of the vehicle. Further, each lifting unit 210 may be configured to include one pair of beam members 211 and 211' so that the transfer robot 10 according to the present exemplary embodiment may be configured to include a total of four beam members 211 and 211'.

The lifting module 210 may be movably coupled to the above-described guide rail of the first frame 110. Substantially, the beam members 211 and 211' which configure the lifting unit 210 move on the guide rail to be in direct contact with the wheels of the vehicle to support and lift the wheels of the vehicle.

The lifting unit 210 configured by a total of two pairs of beam members 211 and 211' may enter under the vehicle from a left side or a right side of the vehicle by movement of the transfer robot 10. A horizontal length of the beam members 211 and 211' may be determined according to the width of the vehicle.

The beam members 211 and 211' of the present exemplary embodiment may be provided as bent members which are generally known as fork bars. Specifically, the beam members 211 and 211' may be configured by a vertical unit 211*a* which is coupled onto the guide rail of the first frame 110 and a horizontal support unit 211*b* which is bent from a lower end of the vertical unit 211*a* to extend in the horizontal direction and be in direct contact with the wheel of the vehicle to support the wheel. In the horizontal support unit 211b, a roller 212 may be installed in a portion which is in contact with the wheel of the vehicle to reduce a frictional force against the wheels.

The rollers 212 may be installed on surfaces on which one pair of beam members 211 and 211' which configures one lifting unit 210 faces each other and may be rotatably coupled onto the beam members 211 and 211'. One pair of rollers 212 is provided so as to correspond to the positions of the left and right wheels of the vehicle, respectively, to be installed in positions spaced from each other along the length direction of the beam members 211 and 211'.

Further, according to the present exemplary embodiment, the plurality of beam members 211 and 211' which configures the lifting unit 210 may behave independently on the guide rail, respectively. For example, one pair of beam members 211 and 211' which configures one lifting unit 210 may move to approach the wheel of the vehicle or be away from the wheel along the extending direction (is also an extending direction of the guide rail) of the first frame 110.

To be more specific, when the lifting unit 210 enters under the vehicle to lift the wheels of the vehicle, one pair of beam members 211 and 211' is located in front and rear directions of the wheels located on the same line along the width direction of the vehicle. At this time, the first beam member 211 located in front of the wheel and the second beam member 211' located behind the wheel may move on the guide rail in opposite directions. The first beam member 211 and the second beam member 211' move to be close to each other, that is, toward the wheel, to support and lift the wheels of the vehicle under mutual cooperation and in contrast, may move away from each other, that is, in an opposite direction of the wheel to release the wheel supporting state and lower the vehicle.

The lifting module 200 of the present exemplary embodiment may further include a power unit (not illustrated) to move the lifting unit 210. The power unit (not illustrated) includes a motor, a gear which rotates by the motor, and a rack which is engaged with the gear to move the lifting unit 210 on the guide rail provided on the frame module 100.

In the meantime, according to the present exemplary embodiment, the lifting unit 210 is configured to be movable not only in the horizontal direction, but also in the vertical direction, on the first frame 110 to be provided to adjust a position when it enters under the vehicle or lifts the vehicle.

The wheel driving module 300 substantially performs a function of moving the transfer robot 10 according to the exemplary embodiment. The wheel driving module 300 provides a moving power of the transfer robot 10 and provides a steering function to adjust a direction during the movement process.

The wheel driving module 300 is installed on a lower end of the frame module 100 to movably support the frame module 100. A plurality of wheel driving modules 300 may be provided and for example, installed on both ends along the length direction of the second frame 120 which is a component of the frame module 100 so that four wheel driving modules 300 may be provided for one transfer robot 10. That is, the transfer robot 10 according to the present exemplary embodiment may be four-point supported by four wheel driving modules 300. However, the present exemplary embodiment is not limited thereto and if necessary, the number of wheel driving modules 300 provided in one transfer robot 10 may also be increased.

In the meantime, referring to FIG. 2, the transfer robot 10 according to the exemplary embodiment maintains a constant state in an unloaded state in which nothing is loaded without changing a center of gravity (CoG).

However, as illustrated in FIG. 3, in a "loaded state" in which a cargo C, such as a vehicle, is loaded on the transfer robot 10, an overall center of gravity changes due to the loaded object. Specifically, like the transfer robot 10 according to the present exemplary embodiment, when a payload is higher than the vehicle body, the center of gravity in the loaded state may significantly change depending on the loaded object so that there is a concern that a motion control performance rapidly deteriorates. The deterioration of the motion control performance may cause the above-described safety accident.

As a configuration for solving this problem, the transfer robot 10 according to the present exemplary embodiment may further include a strain gauge 400 which is installed on the beam members 211 and 211' to measure a displacement of the beam members 211 and 211' by the loaded cargo.

Referring to FIGS. 1 and 4, the strain gauge 400 may be attached onto top surfaces of the beam members 211 and 211', and more specifically, attached onto a top surface of the horizontal support unit 211b which substantially supports the cargo in the beam members 211 and 211'.

Further, in the present exemplary embodiment, each of the plurality of beam members 211 and 211' may be provided with at least one strain gauge 400. When the strain gauges 400 are installed on both sides along the length direction of each of the beam members 211 and 211', the center of gravity may be more accurately estimated.

The displacement value sensed by the strain gauge 400 may be transmitted to a controller (not illustrated) which controls an operation of the transfer robot 10 according to the present exemplary embodiment. The controller (not illustrated) may estimate a changed center of gravity of the transfer robot 10 based on the sensing value of the strain gauge 400 and may automatically correct the control parameter based on the estimated center of gravity.

The transfer robot 10 including four independent wheel driving modules 300 has a basic parameter for control. At this time, when a mass and a center of gravity of the loaded cargo on the transfer robot 10 change, a load applied to each wheel driving module 300 varies. Accordingly, the controller (not illustrated) of the present exemplary embodiment controls to adjust a position or a height of each of the beam members 211 and 211' based on the estimated center of gravity or adjust a rotation speed of the driving motor 330 or the steering motor 342a provided in the wheel driving module 300 to be described below. By doing this, a movement angle or a driving posture of the transfer robot 10 may be stably controlled and as a result, a control stability of the transfer robot 10 may be improved.

As described above, according to the present exemplary embodiment, a system is configured to automatically correct a control parameter based on a center of gravity which changes according to a state (position or shape) of the loaded object loaded on the beam members 211 and 211' of the transfer robot 10.

Hereinafter, a structure of the wheel driving module 300 provided in the transfer robot 10 according to the present exemplary embodiment will be described in more detail.

Referring to FIGS. 5 to 8, the wheel driving module 300 of the present exemplary embodiment may include a wheel 310, a wheel frame 320 to which the wheel 310 is rotatably mounted, a driving unit 330 which rotates the wheel 310, and a steering unit 340 which rotates the wheel frame 320 to adjust a direction of the wheel 310.

The driving unit 330 may be provided as a driving motor 330 which is directly coupled to a wheel shaft of the wheel 310. The driving motor 330 is mounted on the wheel frame 320 in an opposite direction to a mounting direction of the wheel 310 and the wheel shaft of the wheel 310 and the driving motor 330 may be connected by means of a penetrating unit formed in the wheel frame 320.

The wheel 310 is provided to rotate around a horizontal axis by a force applied by the driving motor 330. The wheel 310 may rotate clockwise or counterclockwise around the horizontal axis, thereby performing movement such as forward or backward movement of the transfer robot 10.

In the meantime, in the wheel driving module 300 of the transfer robot 10 according to the present exemplary embodiment, the steering unit 340 may be manufactured with a structure in which the gear unit 341 and the motor unit 342 are separated and the gear unit 341 and the motor unit 342 may be detachably coupled by means of bolt coupling, etc.

Specifically, the steering unit 340 of the present exemplary embodiment may include a gear unit 341 and a motor unit 342. The gear unit 341 includes a steering gear 341a connected to the wheel frame 320 and a gear side housing 341b in which the steering gear 341a is accommodated. The motor unit 342 includes a steering motor 342a which applies a power to rotate the steering gear 341a, an output gear 342b which is coupled to an output shaft of the steering motor 342a and gear-engaged with the steering gear 341a, and a motor side housing 342c in which a space for accommodating the output gear 342b is formed and the steering motor 342a is mounted on the lower end.

A configuration of the gear unit 341 of the steering unit 340 will be described first. The steering gear 341a is provided as a disc gear to be coupled to the rotary shaft provided in the wheel frame 320. Accordingly, when the steering gear 341a rotates, the wheel frame 320 may also rotate by that rotation. The steering gear 341a is gear-engaged with the output gear 342 of the motor unit 342.

The gear side housing 341b provides a space for accommodating the steering gear 341a. The gear side housing 341b has a substantially cylindrical structure corresponding to the shape of the steering gear 341a and has a coupling unit for coupling with the motor side housing 342c to be described below on one side.

To be more specific, the gear side housing 341b may be provided in a shape in which one side portion of the housing provided with a cylindrical shape is cut to open a side wall. Further, on the cut side portion of the gear side housing 341b, a plurality of first fastening holes H1 for bolt-coupling with the motor side housing 342c may be formed.

As one side portion of the gear side housing 341b is provided to be cut, when the steering gear 341a is mounted in the gear side housing 341b, a part of the steering gear 341a protrudes to the outside of the gear side housing 341b.

Next, according to the configuration of the motor unit 342 of the steering unit 340, the steering motor 342a provides a power to rotate the steering gear 341a. The output gear 342b is coupled to an output shaft of the steering motor 342a and outer circumferences of the output gear 342b and the steering gear 341 are engaged (gear engagement) to rotate.

The motor side housing 342c provides a space for accommodating the output gear 342b. Further, a coupling unit for coupling with the gear side housing 341b may also be provided on one side of the motor side housing 342c as described above.

The motor side housing 342c has a coupling unit having a shape corresponding to the gear side housing 341b. A plurality of second fastening holes H2 is formed on one side portion of the motor side housing 342c which is coupled to the gear side housing 341b to allow a bolt B to pass therethrough.

The gear side housing 341b and the motor side housing 342c may be coupled to each other using the bolt B. To be more specific, the gear side housing 341b and the motor side housing 342c may be coupled to each other by the screw-fastening of the bolt B which is inserted through the second fastening hole H2 and the first fastening hole H1 in a state in which the coupling units are in contact with each other.

That is, in the present exemplary embodiment, the gear unit 341 and the motor unit 342 of the steering unit 340 may be detachably assembled by the bolt-coupling between the gear side housing 341b and the motor side housing 342c. When the bolt B is unfastened, the gear unit 341 and the motor unit 342 of the steering unit 340 may be simply separated.

The gear side housing 341b and the motor side housing 342c are coupled to each other to provide a space in which the steering gear 341a and the output gear 342b as described above are accommodated. A part of the steering gear 341a which protrudes from the gear side housing 341b is accommodated in the space of the motor side housing 342c.

Further, a main body of the steering motor 342a may be mounted on a lower end of the motor side housing 342c. The output shaft of the steering motor 342a is installed to pass through the motor side housing 342c and the output gear 342b which is coupled to the output shaft of the steering motor 342a is accommodated in an inner space of the motor side housing 342c.

The operation of the steering unit 340 will be described. The output gear 342b installed on the output shaft of the steering motor 342a rotates by driving the steering motor 342a and a torque of the output gear 342b is transmitted to the steering gear 341a to rotate the rotary shaft of the wheel frame 320. As a result, the wheel frame 320 may rotate in a horizontal direction. That is, the wheel frame 320 which is connected to the steering gear 341a which rotates by the operation of the steering motor 342a rotates around the vertical axis so that the movement direction of the transfer robot 10 according to the present exemplary embodiment may be adjusted.

The wheel driving module 300 provided in the transfer robot 10 according to the present exemplary embodiment has two rotation mechanisms.

A first mechanism is vertical rotation of the wheel 310 to implement a movement function of the transfer robot 10. Here, the vertical rotation of the wheel 310 means rotation around the horizontal axis. The vertical rotation of the wheel 310 may be performed by the operation of the driving unit 330, which allows the transfer robot 10 to move forward or backward.

The transfer robot 10 according to the present exemplary embodiment needs to move when the transfer robot 10 moves to a vehicle to be parked, when the lifting unit 210 enters under the vehicle to start the parking of the vehicle, when the transfer robot moves to a designated parking space while lifting the vehicle, when the lifting unit 210 is withdrawn from the bottom of the vehicle after completing the parking of the vehicle, and when the transfer robot 10 leaves the corresponding space after completing the parking of the vehicle.

A second mechanism is horizontal rotation of the wheel frame 320 to implement the steering function of adjusting the movement direction when the transfer robot 10 moves. Here, the horizontal rotation of the wheel 320 means rotation around the vertical axis. The horizontal rotation of the wheel frame 320 may be achieved by the operation of the steering unit 340, and to be more specific, by rotating the wheel frame 320 with the wheel 310 mounted thereon by the steering unit 340 so that the movement direction of the transfer robot 10 may be changed.

That is, in the wheel driving module 300 of the transfer robot 10 according to the present exemplary embodiment, the driving unit 330 provides a power required for moving the transfer robot 10 and the steering unit 340 provides a power to adjust a movement direction of the transfer robot 10.

Hereinafter, a process of parking a vehicle, that is, a process of transporting a cargo, by a transfer robot 10 according to the present disclosure, will be described.

In order to start a vehicle parking task, the transfer robot 10 according to the present exemplary embodiment moves to a side of a vehicle to be parked. Further, the transfer robot 10 according to the present exemplary embodiment may further move toward the vehicle to allow the lifting unit 210 to enter under the vehicle while being located on the side of the vehicle. A remote control device controls the wheel driving module 300 to move the transfer robot 10 as described above and the movement of the transfer robot 10 is implemented by operation of the driving unit 330 and the movement direction of the transfer robot 10 can be adjusted by operation of the steering unit 340, as described above.

The lifting unit 210 enters under the vehicle so that one pair of beam members 211 and 211' is located in front and behind each wheel located at the front and rear sides of the vehicle to be parked. When the lifting unit 210 enters under the vehicle, if necessary, a height of the lifting unit 210 or a width between one pair of beam members 211 and 211' which configures the lifting unit 210 may be adjusted. For example, the transfer robot 10 scans information, such as a height of the vehicle to be parked and a wheel width and drives a power unit (not illustrated) provided in the lifting module 200 in accordance with the information to appropriately adjust vertical and horizontal positions of the beam members 211 and 211'.

When the lifting unit 210 enters under the vehicle, one pair of beam members 211 and 211' which configures the lifting unit 210 is disposed to face each other with wheels therebetween. In this state, the lifting module 200 is driven to move one pair of beam members 211 and 211' to face each other. By doing this, one pair of beam members 211 and 211' is in contact with wheels. When the pair of beam members 211 and 211' further moves toward each other, the wheels of the vehicle are lifted off while being supported by the pair of beam members 211 and 211' to be spaced apart from the ground.

In the meantime, in a state in which the vehicle is lifted using the lifting unit 210, an overall center of gravity of the transfer robot 10 may change due to the weight of the loaded vehicle. In response to this, according to the present exemplary embodiment, the system may be configured such that a displacement of the beam members 211 and 211' is sensed using the strain gauge 400 attached onto the beam members 211 and 211' and the controller (not illustrated) estimates a changed center of gravity of the transfer robot 10 based on the sensing value received from the strain gauge 400 to automatically correct the control parameter.

The transfer robot 10 which lifts the vehicle using the lifting unit 210 may move to a designated parking position by manipulating the wheel driving module 300 and after moving to a desired parking position, unload the vehicle in the designated parking position to complete the parking task.

When the vehicle is unloaded, one pair of beam members 211 and 211' moves away from each other and thus the wheels of the vehicle are lowered to be in contact with the ground. Further, in this state, one pair of beam members 211 and 211' further moves to be completely spaced apart from the wheels and then the transfer robot 10 completes the parking task of the vehicle and moves to another position.

As described above, the transfer robot 10 according to the present exemplary embodiment continuously or repeatedly performs an operation of moving the frame module which forms a body using the wheel driving module 300 and an operation of lifting or lowering a vehicle using the lifting module 200 to implement automatic parking of a vehicle.

When the cargo, such as a vehicle is loaded, the transfer robot 10 according to the present exemplary embodiment senses the displacement of the beam members 211 and 211' using the strain gauge 400 attached to the beam members 211 and 211' and estimates a changed center of gravity based on the sensing value of the strain gauge 400 to correct the control parameter based on the estimated center of gravity, thereby achieving significantly improved motion control performance.

Further, the transfer robot 10 according to the present exemplary embodiment has a structure in which the gear unit 341 and the motor unit 342 of the steering unit 340 provided in the wheel driving module 300 are separately manufactured to be detachably coupled to achieve excellent assemblability and easy maintenance such as parts replacement and maintenance.

When the transfer robot 10 according to the present exemplary embodiment is used as a parking robot, the transfer robot may automatically park the vehicle without intervention of the user so that the vehicle user's convenience is significantly improved and a limited parking space is efficiently utilized to increase a space usability.

Figure 9:
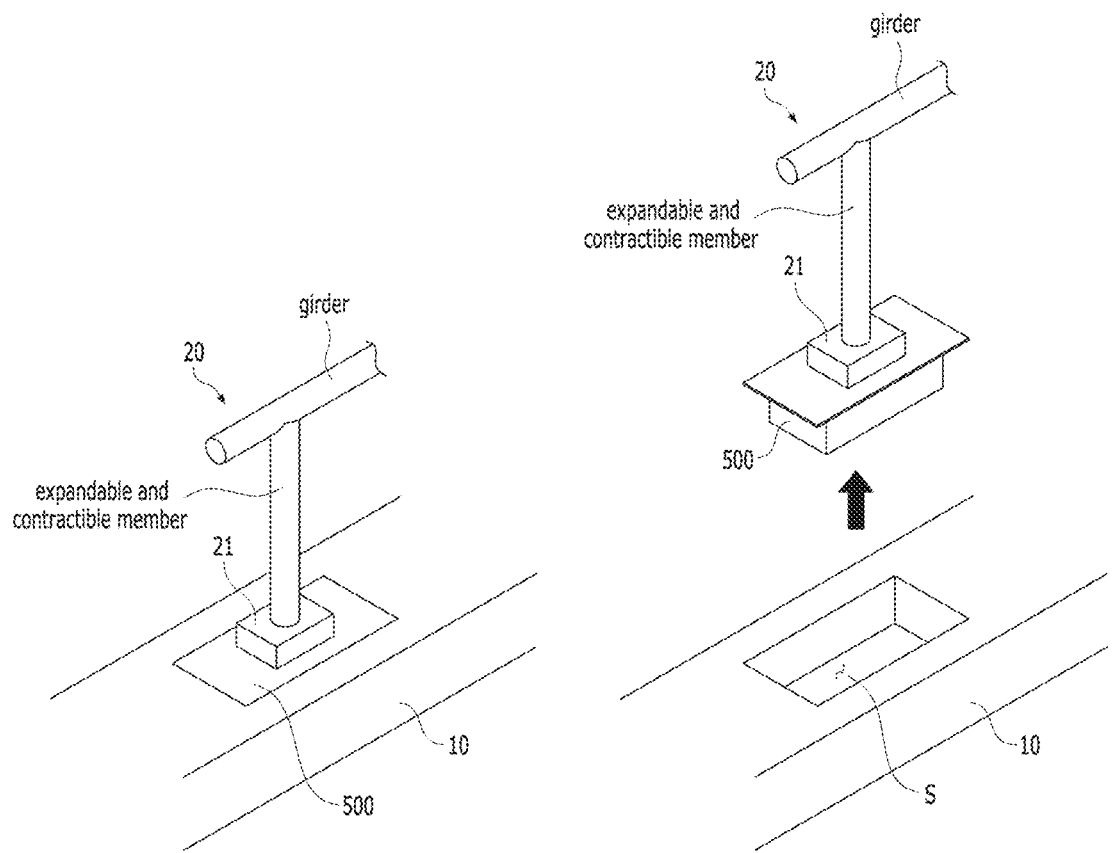
FIG. 9 is a view schematically illustrating an automatic battery replacement system of a transfer robot according to the present exemplary embodiment.

FIG. 9 is a view schematically illustrating an automatic battery replacement system of a transfer robot according to the present exemplary embodiment. Hereinafter, an automatic battery replacement system of a transfer robot which is provided to automatically replace a battery provided on a transfer robot 10 according to the present disclosure will be described with reference to FIG. 9.

First, the transfer robot 10 according to the present exemplary embodiment which has been described above may include a battery 500 as a power source. A power stored in the battery 500 may be used as a driving power to drive the above-described lifting module 200 and a driving power to drive the above-described wheel driving module 300.

The battery 500 may be provided as a battery pack embedded in a metal case. The battery pack is formed by connecting a plurality of battery cells in a serial, parallel, or serial-parallel method in accordance with a desired voltage, capacity, and discharge amount to be combined as one and can perform a charging/discharging process. The battery 500 is supplied with the power from the outside to be charged and discharges the power stored in the battery 500 to be supplied as a driving power of the lifting module 200 and the wheel driving module 300 as described above.

Further, in the present exemplary embodiment, the battery 500 may be detachably mounted on the transfer robot 10. For example, the battery 500 may be mounted to be exposed to a surface of the frame module 100 which configures the body of the transfer robot 10. To this end, a mounting space S in which the battery 500 is mounted may be formed on the first frame 110 or the second frame 120 which configures the frame module 100.

When the battery 500 is inserted into the mounting space S to be mounted, a contact terminal may be provided to automatically achieve electrical connection with a configuration which requires the power, such as the lifting module 200 and the wheel driving module 300. Further, in order to stably seat the battery 500 in the mounting space S, an upper end portion of the battery case may include a stepped structure.

In the meantime, the automatic battery replacement system of a transfer robot according to the present exemplary embodiment may include a controller (not illustrated) which collects information about a remaining capacity of the battery 500 mounted on the transfer robot 10 and issues a battery replacement command to the transfer robot 10 and a battery replacement robot 20 which is provided in a charging station and replaces the battery 500 mounted on the transfer robot 10.

The controller (not illustrated) collects information about the remaining capacity of the battery 500 and if it is determined that the battery 500 needs to be replaced, may command the transfer robot 10 to move to the charging station to replace the battery 500. The transfer robot 10 which receives the command from the controller (not illustrated) may autonomously move to the charging station and the replacement task of the battery 500 mounted on the transfer robot 10 may be performed by the battery replacement robot 20 provided in the charging station.

The battery replacement robot 20 includes a magnet gripper 21 provided as an electromagnet and may suck and handle the battery 500 using the magnet gripper 21. Specifically, the battery replacement robot 20 may perform an operation of sucking the battery 500 using the magnet gripper 21 to be removed from the transfer robot 10 or newly mounting the fully charged battery on the transfer robot 10.

For example, the battery replacement robot 20 may be provided as a gantry robot. The battery replacement robot 20 which is provided as a gantry robot may include a girder installed in a horizontal direction and an elastic member that is slidably coupled to the girder and is provided elastically in a vertical direction and the magnet gripper 21 may be installed on the end of the elastic member. The elastic member is stretched to lower the magnet gripper 21 installed on the end of the elastic member to suck the battery 500 and the elastic member is contracted while sucking the battery 500 to remove the battery 500 from the transfer robot 10. Further, the elastic member slides on the girder to transport the battery 500 to a charging position. Thereafter, the battery replacement robot 20 sucks another fully-charged battery in the charging station using the magnet gripper 21 and mounts the fully-charged battery in the transfer robot 10 by the sliding and stretching operations of the elastic member.

As another example, the battery replacement robot 20 may be provided as selective compliance assembly robot arm (SCARA) called as a horizontal articulated robot. The battery replacement robot 20 provided as SCARA may include an arm member which is axially coupled with respect to at least one rotary shaft and the magnet gripper 21 may be installed on an end of the arm member. The magnet gripper 21 may move within a predetermined operation range by a pivoting or rotational movement of the arm member around the rotary shaft. Processes of sucking the battery 500, removing the battery from the transfer robot 10, transporting the battery to the charging position, and mounting the fully charged battery in the charging station on the transfer robot 10 by adjusting the position of the magnet gripper 21 may be performed in a similar way to the above-described method.

In the meantime, as described above, one battery replacement robot 20 may perform both a task of removing the battery 500 from the transfer robot 10 and a task of mounting the fully-charged battery on the transfer robot 10. However, according to the present exemplary embodiment, two battery replacement robots 20 are provided to allow one of them to perform the task of removing the battery 500 from the transfer robot 10 and the other one to perform the task of mounting the fully-charged battery in the transfer robot 10 to perform the battery replacement task by two ways.

Figure 10:
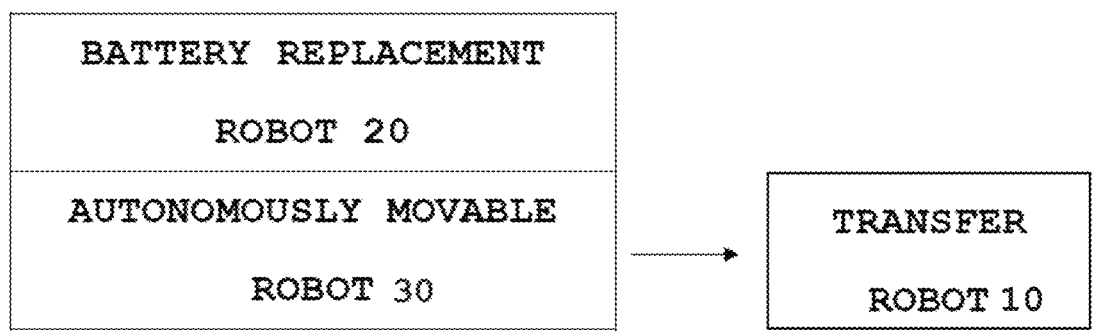
FIG. 10 is a view schematically illustrating an automatic battery replacement system of a battery replacement robot, an autonomously movable robot, and a transfer robot, according to the present exemplary embodiment.

In the above description, even though it is described that the battery replacement robot 20 is provided in the charging station, the battery replacement robot 20 of the present exemplary embodiment may not only be fixed to the charging station, but also be installed on another movable robot. In this case, when the battery 500 needs to be replaced, the transfer robot 10 does not need to directly move to the charging station, but a movable robot mounted with the battery replacement robot 20 moves to the transfer robot 10 which requires the replacement of the battery 500 to perform the replacement task of the battery 500. In such a movable robot, a battery loading space may be provided to collect the battery 500 removed from the transfer robot 10 and transport the battery to the charging station and load the battery fully charged in the charging station to transport the battery to the transfer robot 10. For example, as shown in FIG. 10, the battery replacement robot 20 is installed on an autonomously movable robot 30 and the movable robot 30 directly moves to the transfer robot 10 which needs to replace the battery to perform the battery replacement task.

The automatic battery replacement system of a transfer robot according to the present exemplary embodiment may automatically replace the battery 500 provided in the transfer robot 10 using the magnet gripper 21 to reduce an idle time of the transfer robot 10 and increase an operating rate.

What is claimed is:

1. An automatic battery replacement system of a transfer robot, comprising:
   a transfer robot which autonomously moves and includes a lifting module which supports and lifts a cargo;
   a battery which is detachably mounted on the transfer robot and is provided as a power source to supply a power required for an operation of the transfer robot; and
   a battery replacement robot which sucks and handles the battery and performs an operation of sucking the battery previously mounted on the transfer robot to be removed or mounting a new fully-charged battery on the transfer robot,
   wherein the battery replacement robot is mounted on an autonomously movable robot and moves to the transfer robot which needs to replace the battery to perform a battery replacement task.

2. The automatic battery replacement system according to claim 1, wherein a mounting space in which the battery is mounted is formed in a vehicle body of the transfer robot and the battery is mounted to be exposed on a surface of the vehicle body.

3. The automatic battery replacement system according to claim 1, wherein the battery replacement robot sucks the battery using a magnet gripper provided as an electromagnet.

4. The automatic battery replacement system according to claim 3, wherein the battery includes a metal case embedded with a battery pack.

5. An automatic battery replacement system of a transfer robot, comprising:
- a transfer robot which autonomously moves and includes a lifting module which supports and lifts a cargo;
- a battery which is detachably mounted on the transfer robot and is provided as a power source to supply a power required for an operation of the transfer robot; and
- a battery replacement robot which sucks and handles the battery and performs an operation of sucking the battery previously mounted on the transfer robot to be removed or mounting a new fully-charged battery on the transfer robot,
- wherein the battery replacement robot sucks the battery using a magnet gripper provided as an electromagnet,
- wherein the battery replacement robot includes:
- a girder installed in a horizontal direction; and
- an extendable/retractable member which is slidably coupled onto the girder and is provided to be stretchable in a vertical direction, and
- wherein the magnet gripper is installed on an end of the extendable/retractable member.

6. An automatic battery replacement method of replacing a battery of a transfer robot which autonomously moves and includes a lifting module which supports and lifts a cargo and detachably mounts the battery used as a power source, comprising:
- a collecting step of collecting information about a remaining capacity of the battery mounted on the transfer robot;
- a command step of issuing a battery replacement command to the transfer robot when it is determined that it is necessary to replace the battery mounted on the transfer robot;
- a moving step of moving the battery replacement robot, which is mounted on an autonomously movable robot, to the transfer robot which needs to replace the battery to perform a battery replacement task;
- a removing step of allowing a battery replacement robot to suck and remove the battery mounted on the transfer robot using a magnet gripper; and
- a mounting step of allowing the battery replacement robot to suck a fully-charged battery using the magnet gripper to be mounted on the transfer robot.

7. The automatic battery replacement method according to claim 6, wherein the removing step and the mounting step are sequentially performed by the battery replacement robot.

8. The automatic battery replacement method according to claim 6, wherein the battery replacement robot includes:
- a girder installed in a horizontal direction and
- an extendable/retractable member which is slidably coupled onto the girder and is provided to be stretchable in a vertical direction and
- the magnet gripper is installed on an end of the extendable/retractable member.

\* \* \* \* \*